(12) United States Patent
Edirisooriya

(10) Patent No.: US 6,247,157 B1
(45) Date of Patent: Jun. 12, 2001

(54) METHOD OF ENCODING DATA SIGNALS FOR STORAGE

(75) Inventor: Samantha J. W. Edirisooriya, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/078,389

(22) Filed: May 13, 1998

(51) Int. Cl.$^7$ .................................. G11C 29/00
(52) U.S. Cl. .................. 714/767; 714/6; 714/766; 714/800
(58) Field of Search .................. 714/5, 7, 710, 714/755, 756, 766, 767, 770, 802, 6, 800, 807

(56) References Cited

U.S. PATENT DOCUMENTS

| | | | |
|---|---|---|---|
| 4,092,732 | * 5/1978 | Ouchi | 714/5 |
| 4,796,260 | * 1/1989 | Schilling et al. | 714/755 |
| 4,914,656 | * 4/1990 | Dumfry, Jr. et al. | 714/710 |
| 5,258,984 | 11/1993 | Menon et al. | 714/7 |
| 5,265,098 | 11/1993 | Mattson et al. | 714/6 |
| 5,579,475 | * 11/1996 | Blaum et al. | 714/7 |

OTHER PUBLICATIONS

Mario Blaum, Jim Brady, Jehoshua Bruck, Jai Menon, "EVENODD: An Efficient Scheme for Tolerating Double Disk Failures in RAID Architectures", IEEE Transactions On Computers, vol. 44, No. 2, Feb. 1995 (pp. 192–202), pp. 1–26.

Chan–Ik Park, "Efficient Placement of Parity and Data to Tolerate Two Disk Failures in Disk Array Systems", IEEE Transactions on Parallel and Distributed Systems, vol. 6, No. 11, Nov. 1995, pp. 1177–1184.

Mario Blaum, Jim Brady, Jehoshua Bruck, Jai Menon, EVENODD: An Optimal Scheme for Tolerating Double Disk Failures in RAID Architectures, IBM Almaden Research Center, San Jose, CA 95120, 1063–6897/94 IEEE, pp. 245–254.

Gibson, Hellerstein, Karp, Katz, Patteson, "Failure Correction Techniques for Large Disk Arrays" Computer Science Division, Electrical Engineering and Computer Sciences, University of California at Berkeley, 1989 ACM, pp. 123–441.

* cited by examiner

Primary Examiner—Emmanuel L. Moise
(74) Attorney, Agent, or Firm—Kenneth Seddon

(57) ABSTRACT

Briefly, in accordance with one embodiment of the invention, a method of encoding data signals for storage to tolerate failure of a storage unit of a storage medium includes the following. For N+2 storage units, N being a positive integer, each of the storage units being divided into N storage blocks, 2N blocks of priority signals are produced from (N)(N) blocks of data signals. The N(N+2) blocks of parity and data signals are allocated over the N+2 storage units of the storage medium so that the 2N blocks of parity signals are not exclusively stored in two of the N+2 storage units. Briefly, in accordance with another embodiment of the invention, a storage medium includes: N+2 storage units to store binary digital signals, N being a positive integer, each of the storage units being divided into N storage blocks, the N+2 storage units having stored thereon 2N blocks of parity signals and (N)(N) blocks of data signals, the 2N blocks of parity signals being based upon the (N)(N) blocks of data signals. The 2N blocks of parity signals are distributively stored over the N+2 storage units so that the 2N blocks of parity signals are not exclusively stored in two of the N+2 storage units.

36 Claims, 3 Drawing Sheets

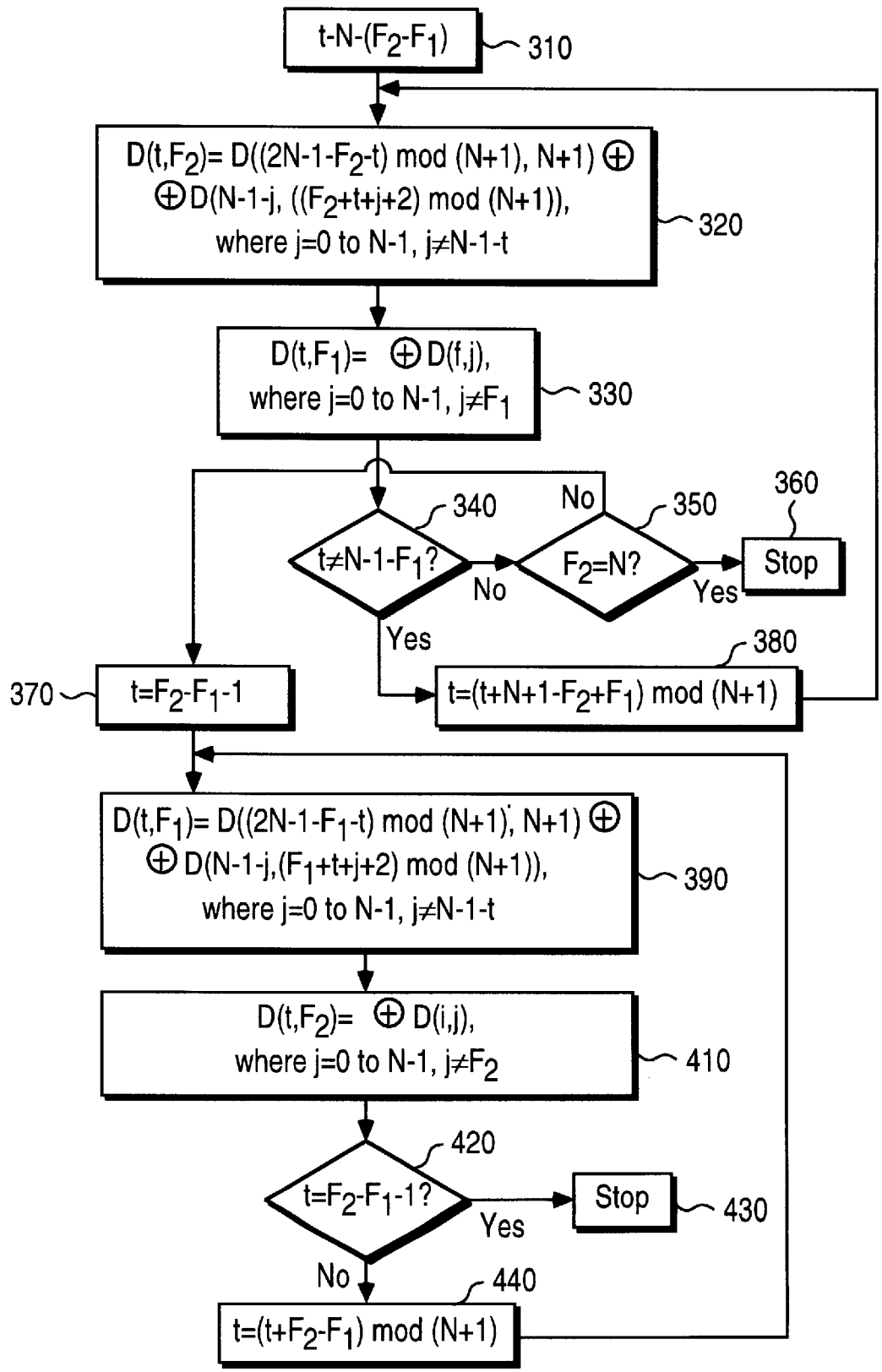

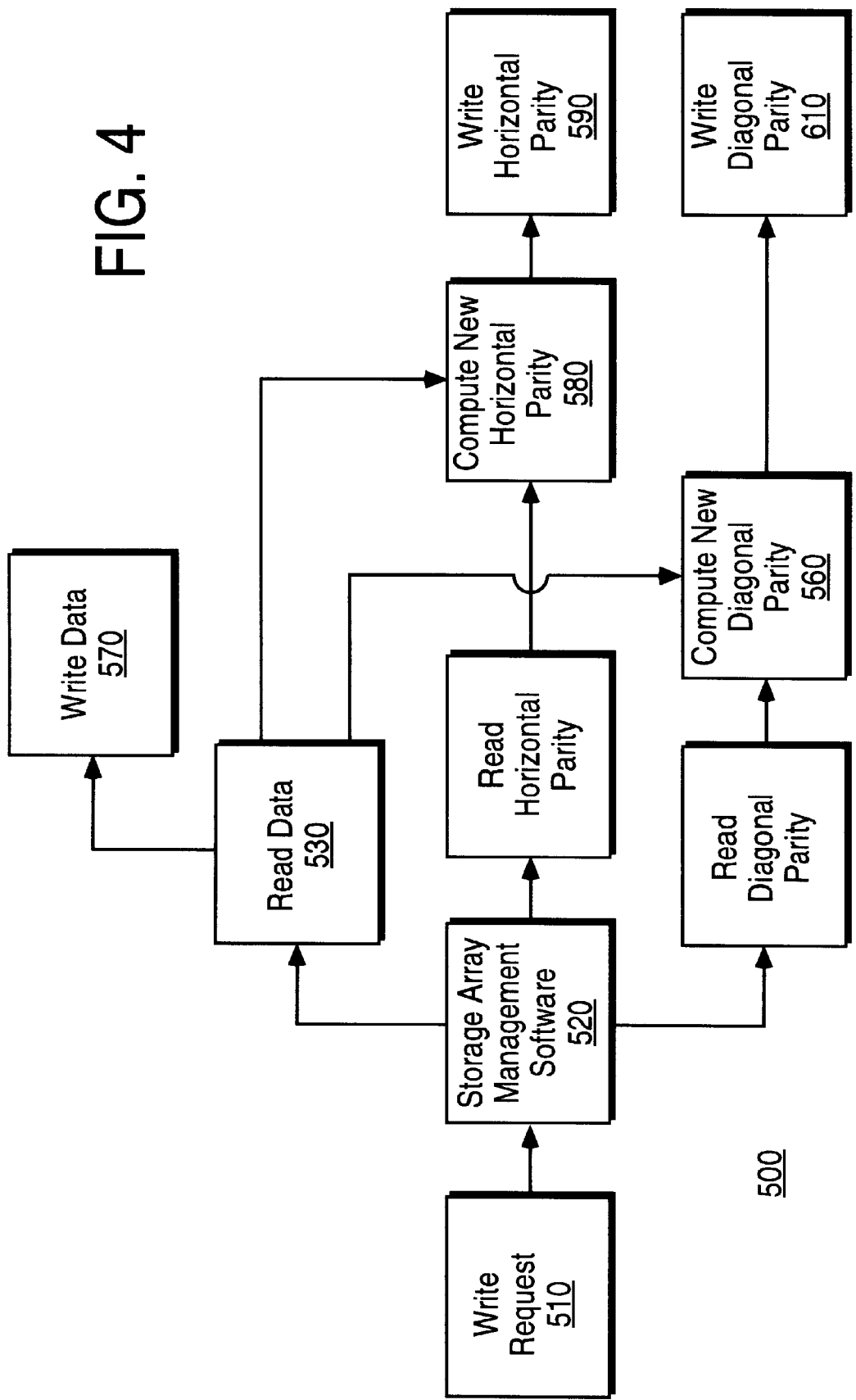

METHOD OF ENCODING DATA SIGNALS FOR STORAGE

BACKGROUND

1. Field

The invention is related to encoding data signals and, more particularly, to encoding data signals for storage.

2. Background Information

As is well-known, it is common, in connection with the operation of a personal computer (PC) or other computer, to store data signals in a secondary memory or storage medium, such as a hard drive, disk or disk array, for example. Redundant disk arrays may be used to build highly available and reliable disk subsystems. Typically, the data signals are "exclusive-ORed" from some number of disks and maintained on a redundant disk and, in the event of a disk failure, the data signals on the failed disk are reconstructed using the data on surviving disks and writing this into a spare disk. However, data signals may also be lost if a second disk fails before the reconstruction is complete. Unfortunately, traditional disk arrays typically are inadequate for protecting from the loss of more than one disk. Therefore, a technique that will not lose data signals even when multiple disks fail and that, likewise, exhibits efficient performance is desirable.

SUMMARY

Briefly, in accordance with one embodiment of the invention, a method of encoding data signals for storage to tolerate failure of a storage unit of a storage medium includes the following.

For N+2 storage units, N being a positive integer, each of the storage units being divided into N storage blocks, 2N blocks of priority signals are produced from (N)(N) blocks of data signals. The N(N+2) blocks of parity and data signals are allocated over the N+2 storage units of the storage medium so that the 2N blocks of parity signals are not exclusively stored in two of the N+2 storage units.

Briefly, in accordance with another embodiment of the invention, a storage medium includes: N+2 storage units to store binary digital signals, N being a positive integer, each of the storage units being divided into N storage blocks, the N+2 storage units having stored thereon 2N blocks of parity signals and (N)(N) blocks of data signals, the 2N blocks of parity signals being based upon the (N)(N) blocks of data signals. The 2N blocks of parity signals are distributively stored over the N+2 storage units so that the 2N blocks of parity signals are not exclusively stored in two of the N+2 storage units.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a flowchart illustrating a portion of one embodiment of a method of reconstructing data signals that have been encoded for storage in accordance with the present invention; and FIG. 4 is a diagram illustrating an embodiment of a process of updating data signals that have been encoded for storage in accordance with the application of FIG. 1.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have been described in detail so as not to obscure the present invention.

Figure 2:
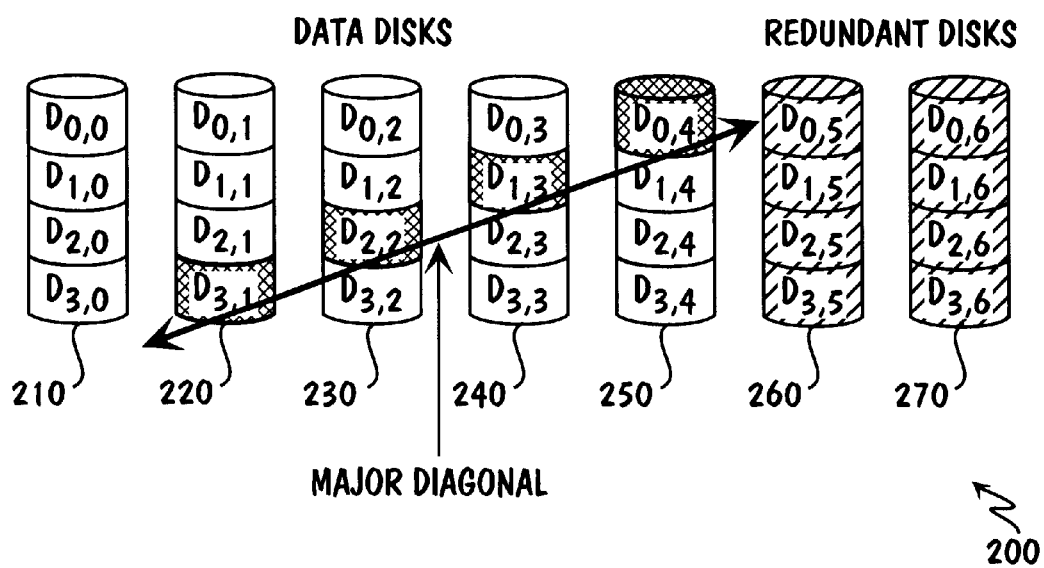
FIG. 2 is a diagram illustrating the application of a prior art technique for encoding data signals for storage.

FIG. 2 is a schematic diagram illustrating the application of a method of encoding data signals for storage using a prior art technique. In this scheme, referred to as the "EVENODD" scheme, proposed in "EVENODD: An efficient scheme for tolerating double disk failures in RAID architectures" IEEE transactions computers, Vol. 44, No. 2, pages 192–202, February 1995, redundant disks are used to store parity or redundancy information in the form of binary digital signals in this particular embodiment. See also Blaum, Brady, Bruck, and Menon, "Methods and means for encoding and rebuilding data contents up to two unavailable DASDSs in a DASD array using simple non-recursive diagonal and row parity," U.S. Pat. No. 5,579,475, issued November, 1996. See also Paul Massiglia, The RAID book, RAID Advisory Board, 1997 (chapter 6 of this book describes RAID level 6). The number of disks storing data signals, N, may be assumed, where convenient, to be a prime number. However, this is not a limitation of the scheme in that it may handle an arbitrary number of disks storing data signals by assuming that there are disks containing no signal information and, therefore, all data binary digital signals or bits on those disks are zero. Therefore, when a number of data disks is not a prime, N may be chosen, for example, such that it is the closest prime greater than the number of data disks.

FIG. 2 illustrates an implementation of this scheme for five data disks. The parity signal information is stored in the disks labeled "redundant disks" identified as the following blocks:

$$D(0,5), D(1,5), D(2,5), D(3,5), D(0,6)\ D(1,6), D(2,6)\ \text{and}\ D(3,6).$$

In this embodiment, the disks are divided into blocks of either data signals or parity signals, as illustrated in FIG. 2. This parity signal information may be computed in accordance with the following equations:

$$D(0,5)=D(0,0)\oplus D(0,1)\oplus D(0,2)\oplus D(0,3)\oplus D(0,4)$$

$$D(1,5)=D(1,0)\oplus D(1,1)\oplus D(1,2)\oplus D(1,3)\oplus D(1,4)$$

$$D(2,5)=D(2,0)\oplus D(2,1)\oplus D(2,2)\oplus D(2,3)\oplus D(2,4)$$

$$D(3,5)=D(3,0)\oplus D(3,1)\oplus D(3,2)\oplus D(3,3)\oplus D(3,4)$$

$$D(0,6)=S\oplus D(0,0)\oplus D(3,2)\oplus D(2,3)\oplus D(1,4)$$

$$D(1,6)=S\oplus D(1,0)\oplus D(0,1)\oplus D(3,3)\oplus D(2,4)$$

$$D(2,6)=S\oplus D(2,0)\oplus D(1,1)\oplus D(0,2)\oplus D(3,4)$$

$$D(3,6)=S\oplus D(3,0)\oplus D(2,1)\oplus D(1,2)\oplus D(0,3)$$

$$S=D(3,1)\oplus D(2,2)\oplus D(1,3)\oplus D(0,4)$$

Employing this technique, 35 exclusive OR ("XOR") operations are performed to encode the parity signal information for a disk array with the data capacity of five disks. If there are four data disks, 27 XOR operations are employed to encode the data signals, as data storage blocks $D(0,4)$, $D(1,4)$, $D(2,4)$, and $D(3,4)$ are assumed, in this example, to contain all zeros.

One aspect of employing encoded redundant signal information is the efficiency of the method in terms of "write" operations when updating a data block. For example, this technique employs two additional write operations ("writes") for every write if the data block to be written is not part of the major diagonal illustrated in FIG. 2. If the block to be written is part of the major diagonal, then five additional writes are employed. In general, N additional writes are employed. Therefore, assuming the data blocks are all accessed with equal probability, for an array with five data disks, the expected number of additional writes for update is 2.6. If there are four data disks, the expected number of additional writes per update is 2.56. In general, the expected number of additional writes per update is $3-(1/N)$, and, hence, approaches 3 for large values of N.

If both redundant disks fail, the lost parity signal information may be computed from the contents of the data disks or data storage units using the above encoding procedure. Hence, the complexity of the reconstruction is equivalent to the complexity of the encoding. However, if two data disks fail, then 44 XOR operations are employed to reconstruct the lost data. For example, assume that storage units or disks 0 and 2 have failed. Then, the lost data storage blocks, $D(0,0)$, $D(1,0)$, $D(2,0)$, $D(3,0)$, $D(0,2)$, $D(1,2)$, $D(2,2)$, and $D(3,2)$ are obtained using the following sequence of operations.

$$S=D(0,5) \oplus D(1,5) \oplus D(2,5) \oplus D(3,5) \oplus D(0,6) \oplus D(1,6) \oplus D(2,6) \oplus D(3,6)$$

$$S(0)_0=D(0,1) \oplus D(0,3) \oplus D(0,4)$$

$$S(0)_1=D(1,1) \oplus D(1,3) \oplus D(1,4)$$

$$S(0)_2=D(2,1) \oplus D(2,3) \oplus D(2,4)$$

$$S(0)_3=D(3,1) \oplus D(3,3) \oplus D(3,4)$$

$$S(0)_4=D(4,1) \oplus D(4,3) \oplus D(4,4)$$

$$S(1)_0=S \oplus D(0,6) \oplus D(4,1) \oplus D(2,3) \oplus D(1,4)$$

$$S(1)_1=S \oplus D(1,6) \oplus D(0,1) \oplus D(3,3) \oplus D(2,4)$$

$$S(1)_2=S \oplus D(2,6) \oplus D(1,1) \oplus D(4,3) \oplus D(3,4)$$

$$S(1)_3=S \oplus D(3,3) \oplus D(2,1) \oplus D(0,3) \oplus D(4,4)$$

$$S(1)_4=S \oplus D(4,6) \oplus D(3,1) \oplus D(1,3) \oplus D(0,4)$$

$$D(2,2)=S(1)_4$$

$$D(2,0)=S(0)_2 \oplus D(2,2)$$

$$D(0,2)=S(1)_2 \oplus D(2,0)$$

$$D(0,0)=S(0)_0 \oplus D(0,2)$$

$$D(3,2)=S(1)_0 \oplus D(0,0)$$

$$D(3,0)=S(0)_3 \oplus D(3,2)$$

$$D(1,2)=S(1)_3 \oplus D(3,0)$$

$$D(1,0)=S(0)_3 \oplus D(1,2)$$

Therefore, 44 XOR operations are performed to reconstruct data signals contained in the two failed data storage units. Also, note that if the number of storage units is four then 34 XOR operations are performed to reconstruct the lost data storage blocks. Assuming all data storage units in the array have the same probability of failing, the expected number of XOR operations to reconstruct data in the event of the failure of two storage units in an array with four data storage units is about 29.8.

Figure 1:
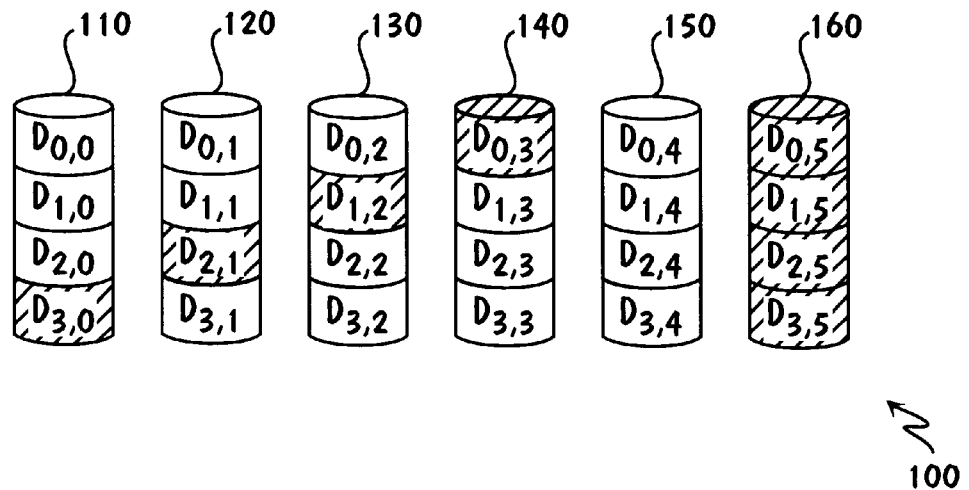
FIG. 1 is a diagram illustrating the application of a method of encoding data signals for storage in accordance with the present invention.

FIG. 1 is a schematic diagram illustrating an application of an embodiment of a method of encoding data signals for storage in accordance with the present invention. In this example, the storage array includes six storage units comprising both data signal storage units and parity signal storage units. Therefore, the number of data storage units this storage array has equivalent storage capability to match is N, in this example, four. Of course, the invention is not limited in scope to this amount of data storage capability or to this particular example. Where the amount of data stored is the capacity of N storage units, four in this embodiment, each of the N storage units of data capacity are divided into N data storage blocks. In addition, as shall be explained in more detail below, 2N blocks of parity signals are produced from $(N)(N)$ blocks of data signals. Likewise, in this particular embodiment, the $N(N+2)$ blocks of parity and data signals are allocated over N+2 storage units of the storage medium so that the 2N blocks of parity signals are not exclusively stored in two of the N+2 storage units, in contrast with the EVENODD scheme.

The parity signals in this embodiment comprise both horizontal parity signals and diagonal parity signals. As illustrated in FIG. 1, in this embodiment the diagonal parity signals are exclusively stored in one of the N+2 storage units. Likewise, in this embodiment, in contrast to the EVENODD scheme, the horizontal parity signals are distributively stored across only N of the N+2 storage units. Further, in this embodiment, one of the N+2 storage units exclusively stores data signals, also illustrated in FIG. 1.

In this particular scheme, assume N+1 is a prime number. As with the EVENODD scheme, this technique may handle an arbitrary number of storage units by simply assuming there are storage units with no data signal information and, therefore, all data bits on those units are zero. As illustrated in FIG. 1, for simplicity, assume that each storage unit has N data blocks, in this particular example, 4. Of course, the invention is not limited in scope in this respect. For example, an arbitrary storage unit capacity may be handled by treating each group of N blocks separately. Also, in this scheme a data block may have an arbitrary number of bits. For this example, the parity signal information $D(0,3)$, $D(1,2)$, $D(2,1)$, $D(3,0)$, $D(0,5)$, $D(1,5)$, $D(2,5)$, and $D(3,5)$ are computed in accordance with the following equations:

Horizontal Parity $$D(0,3)=D(0,0) \oplus D(0,1) \oplus D(0,2) \oplus D(0,4)$$

$$D(1,2)=D(1,0) \oplus D(1,1) \oplus D(1,3) \oplus D(1,4)$$

$$D(2,1)=D(2,0) \oplus D(2,2) \oplus D(2,3) \oplus D(2,4)$$

$$D(3,0)=D(3,1) \oplus D(3,2) \oplus D(3,3) \oplus D(3,4)$$

Diagonal Parity $$D(0,5)=D(3,4) \oplus D(2,0) \oplus D(1,1) \oplus D(0,2)$$

$$D(1,5)=D(3,3) \oplus D(2,4) \oplus D(1,0) \oplus D(0,1)$$

$$D(2,5)=D(3,2) \oplus D(2,3) \oplus D(1,4) \oplus D(0,0)$$

$$D(3,5)=D(3,1) \oplus D(2,2) \oplus D(1,3) \oplus D(0,4)$$

As this example illustrates, 24 XOR operations are performed to encode the parity signal information for a storage array with a storage capacity equivalent to four storage units. The EVENODD scheme employs 27 XOR operations for an equivalent data capacity, as previously described. Therefore, this example illustrates that the encoding complexity of a method of encoding data signals for storage in accordance with the present invention is less than that of EVENODD scheme. In general, encoding employs 2N(N−1) XOR operations.

With respect to updating a block, the proposed technique employs only two additional writes independent of the location of the block, as shall be explained in greater detail below. Hence, the update performance of the proposed scheme is likewise better than that of the EVENODD scheme.

This embodiment of a method of encoding data signals for storage in accordance with the present invention likewise provides better recovery from double disk or storage unit failures as well. Let $F_1$ and $F_2$ be the failed storage units. If $F_1$ is greater than or equal to zero and less than or equal to N, and $F_2$ is equal to N+1, then $F_1$ may be reconstructed using horizontal parity. After reconstructing $F_1$, since all data blocks are available with these particular failures, diagonal parity signal information stored in $F_2$ may be reconstructed directly using the encoding procedure. Hence, in this case, this embodiment employs 24 XOR operations to reconstruct signal information stored in the two failed storage units. If, however, $F_1$ is less than $F_2$ and $F_1$ is greater than or equal to zero, and $F_2$ is less than or equal to N, then both storage units carry data signal information or both data and parity signal information. Even for this case, this particular implementation in accordance with the invention employs only 24 XOR operations, in this example, to restore the lost data and or parity signal information.

Several examples below illustrate that the proposed encoding technique employs only 24 XOR operations to reconstruct lost data, as opposed to 34 employed by the EVENODD scheme. Independent of the two failed storage units in this example, this scheme always employs exactly 24 XOR operations to reconstruct data signals from the surviving storage units. The EVENODD scheme employs on the average 29.8 XOR operations to recover from the two storage unit failures. Therefore, the reconstruction complexity of this embodiment of a method of encoding data signals for storage in accordance with the present invention is less than that of EVENODD scheme.

Assume, for example, that storage units 1 and 4 have failed. In this example, this corresponds to blocks D(0,1), D(1,1), D(2,1), D(3,1), D(0,4), D(1,4), D(2,4), and D(3,4) being lost. Using this particular embodiment of a method of encoding data signals for storage in accordance with the present invention, one diagonal parity group does not contain any data blocks from storage unit 1 and another diagonal parity group does not contain any data blocks from storage unit 4. Either, therefore, might, in this example, be employed as a starting point. In this example, we begin with the diagonal parity group which does not include any data blocks from storage unit one, in this example, D(3,2), D(2,3), D(1,4), D(0,0). D(1,4) is then constructed as follows:

$$D(1,4)=D(3,2)\oplus D(2,3)\oplus D(0,0)\oplus D(2,5).$$

The horizontal parity group, D(1,0), D(1,2), D(1,3), D(1,4), is used in this example to construct D(1,1) as follows:

$$D(1,1)=D(1,0)\oplus D(1,2)\oplus D(1,3)\oplus D(1,4).$$

Now, the diagonal parity group which contains D(1,1) is used to obtain D(3,4) as follows:

$$D(3,4)=D(2,0)\oplus D(1,1)\oplus D(0,2)\oplus D(0,5).$$

Horizontal parity group, D(3,1), D(3,2), D(3,3), D(3,4), is used to construct D(3,1) as follows:

$$D(3,1)=D(3,0)\oplus D(3,2)\oplus D(3,3)\oplus D(3,4).$$

Then use the diagonal parity group which contains D(3,1) to obtain D(0,4):

$$D(0,4)=D(3,1)\oplus D(2,2)\oplus D(1,3)\oplus D(3,5).$$

Then use the following horizontal group to construct D(0,1):

$$D(0,1)=D(0,0)\oplus D(0,2)\oplus D(0,3)\oplus D(0,4).$$

Then use the diagonal parity group which contains D(0,1) to obtain D(2,4):

$$D(2,4)=D(3,3)\oplus D(1,0)\oplus D(0,1)\oplus D(1,5).$$

Then use the following horizontal parity group to construct D(2,1):

$$D(2,1)=D(2,0)\oplus D(2,2)\oplus D(2,3)\oplus D(2,4).$$

In this example, one of the failed storage units, storage unit 4, has only data blocks, for this embodiment. The next example illustrates a situation where both failed storage units contain only data and parity signals.

Instead, assume storage units 0 and 2 have failed. In this example, for this embodiment, this means blocks D(0,0), D(1,0), D(2,0), D(3,0), D(0,2), D(1,2), D(2,2), and D(3,2) are lost. In this example, the diagonal parity group D(3,1), D(2,2), D(1,3), and D(0,4) include no data blocks from storage unit 0. Therefore, construct D(2,2) as follows:

$$D(2,2)=D(3,1)\oplus D(3,5)\oplus D(1,3)\oplus D(0,4).$$

Use the following horizontal parity group to construct D(2,0):

$$D(2,0)=D(2,1)\oplus D(2,2)\oplus D(2,3)\oplus D(2,4).$$

Use the diagonal parity group that contains D(2,0) to obtain D(0,2):

$$D(0,2)=D(3,4)\oplus D(2,0)\oplus D(1,1)\oplus D(0,5).$$

Use the following horizontal parity group to construct D(0,0):

$$D(0,0)=D(0,3)\oplus D(0,1)\oplus D(0,2)\oplus D(0,4).$$

Use the diagonal parity group which contains D(0,0) to obtain D(3,2):

$$D(3,2)=D(2,5)\oplus D(2,3)\oplus D(1,4)\oplus D(0,0).$$

Use the following horizontal parity group to construct D(3,0):

$$D(3,0)=D(3,1)\oplus D(3,2)\oplus D(3,3)\oplus D(3,4).$$

In this example, D(3,0) is a horizontal parity block. Therefore, to obtain another block from a diagonal parity group, the group, D(3,3), D(4,4), D(1,0), D(0,1), is used, which contains no data blocks from storage unit 2, to construct D(1,0) as follows:

$$D(1,0)=D(3,3)\oplus D(2,4)\oplus D(1,5)\oplus D(0,1).$$

In this example, the reconstruction is completed by using the following horizontal parity group to obtain D(1,2):

$$D(1,2)=D(1,0)\oplus D(1,1)\oplus D(1,3)\oplus D(1,4).$$

In general, when two storage units fail simultaneously, for this particular embodiment, the reconstruction procedure employs 2N(N−1) XOR operations, which in this embodiment is identical to the number of XOR operations employed to encode the data signals. Hence, as previously illustrated, this particular embodiment of a method of encoding data signals for storage in accordance with the present invention performs better than the EVENODD method when encoding, when updating, and when reconstructing data signals when two storage units fail.

Although FIG. 1 illustrates one particular embodiment for four data storage units, another embodiment, in which the number of data storage units may be unspecified, is as follows. Consider a storage array with N+2 storage units. As with the EVENODD scheme, in this particular embodiment, two storage units worth of storage capacity are employed to store the parity signal information. In order to simplify this embodiment, assume that each of the N+2 storage units have N storage blocks, if N+1 is a prime number, otherwise, assume M storage blocks, where M+1 is the least prime number greater than N+1. Of course, in alternative embodiments storage units with various capacities may be handled by considering each of the N (M if N+1 is not a prime number) storage blocks associated with a storage unit separately. If a storage block of a storage unit contains parity signal information, it is referred to in this context as a parity block. Likewise, if a storage block of a storage unit contains data signal information, it is referred to in this context as a data block.

Consider an N(N+2) array of data blocks such that data block D(i,j) (where i is greater than or equal to zero and less than or equal to N−1, and j is greater than or equal to zero and less than or equal to N+1) is the $i^{th}$ data block in the $j^{th}$ storage unit. The storage array has (N)(N) blocks of data signals and 2N blocks of parity signals. The question is how to obtain the parity signals and place the 2N parity blocks in the storage array such that the contents in any two storage units may be constructed from the contents of the other N storage units in the array. The parity signal information is generated and placed in the storage array as follows, using only XOR operations in this embodiment in accordance with the following equations:

$$D(i,N-1-i)=\oplus D(i,j), \text{ where } j=0 \text{ to } N, j \neq N-1-i, \ 0 \leq i \leq N-1 \quad [1]$$

$$D(i,N+1)=\oplus D(N-1-j,(N-i+j)\bmod(N+1)), \text{ where } j=0 \text{ to } N-1, 0 \leq i \leq N-1 \quad [2]$$

Equation [1] defines the horizontal parity signal generation and placement. The storage unit blocks D(0,N−1), D(1,N−2), . . . D(N−1,O), contain horizontal parity signal information. Equation [2] defines diagonal parity signals generated for the parity blocks. According to equation [2], the parity blocks D(0,N+1), D(1,N+1), . . . D(N−1, N+1) contain diagonal parity signal information. As previously indicated, in this embodiment, the diagonal parity signal information is stored exclusively in the N+1$^{st}$ storage unit.

As previously described, an update operation for this particular embodiment employs two additional write operations for every write, irrespective of the block to be written. Assume a write is to be performed to block D(i,j). In order to accomplish this, additional writes are performed to the parity block D(i,N−1−i) [horizontal parity] and D((2N−1−i−j) mod (N+1), N+1) [diagonal parity]. A signal value to be written is obtained using equations [1] and [2] above.

FIG. 4 is a block diagram illustrating an embodiment 500 of a process for performing an update for this particular embodiment. As illustrated, a write request 510 is made to the storage unit. In this embodiment, this request is relayed to the storage array management software 52, although the invention is not limited in scope in this respect. In this embodiment, updating data signals will also involve updating associated parity signals. Therefore, as illustrated, three separate read operations are performed. It is noted that the time for a read operation is assumed in this embodiment to be relatively small compared with a write operation due to the presence of cache memory; however, the invention is not limited in scope in this respect. As illustrated, in addition to reading the data signal to be updated, the associated horizontal and diagonal parity signals are also read. At 560 and 580, a new or updated horizontal and diagonal parity signal is obtained. In this embodiment, these are obtained using the prior horizontal and diagonal parity signals, the data signal to be updated, and the data signal replacing the data signal being updated, in this embodiment. At 570, 590, and 610, the updated data and parity signals are written. Of course, the invention is not restricted to performing these operations in parallel, sequentially or otherwise. It will depend on a variety of factors unrelated to the invention how this is to be accomplished.

Like the encoding process, the decoding process in this particular embodiment may be accomplished using only XOR operations to recover from one or two storage unit failures. In this embodiment, these two failure modes are treated separately. Let $F_1$ be the failed storage unit. If $F_1$ is greater than or equal to zero and less than or equal to N, then the lost data signals (when $F_1$ equals N) or data and parity signals (when $F_1$ is less than or equal to N−1 and greater than or equal to zero) may be recovered using horizontal parity signal encoding. By substituting N−1−i with $F_1$ in equation [1] above.

$$D(i,F_1)=\oplus D(i,j), \text{ where } j=0 \text{ to } N, j \neq F_1, 0 \leq i \leq N-1 \quad [3]$$

If $F_1$ equals N+1 (i.e., the diagonal parity storage unit has failed) then it may be reconstructed using a process in accordance with equation [2].

Alternatively, assume two storage units have failed. Let $F_1$ and $F_2$ be the two failed storage units. In one case, assume $F_1$ is greater than or equal to zero and less than or equal to N and $F_2$ is equal to N+1. In that case, $F_1$ may be recovered in accordance with equation [3] above. Likewise, $F_2$ may be recovered using equation [2] and the reconstructed blocks of storage unit $F_1$.

In an alternative case, $F_1$ may be less than $F_2$ and $F_1$ may be greater than or equal to zero. Likewise, $F_2$ may be less than or equal to N. In this case, both failed storage units store data or data and parity signal information. Likewise, due to the condition stated above, $F_1$ is greater than or equal to zero and less than or equal to N−1. Therefore, according to equation [2] above, the storage unit $F_1$ contains (N−1) data blocks and one parity block. In this case, a more complex approach, illustrated in FIG. 3, is employed.

It will, of course, be appreciated that the invention is not limited in scope to the approach illustrated in FIG. 3. Other approaches are possible and may provide satisfactory results. For this embodiment, if $F_1$ is less than or equal to N−1 and $F_2$ equals N, then, in the first loop illustrated in FIG. 3, $D(F_1,N)$ is obtained using diagonal parity, then $D(F_1,F_1)$, using horizontal parity and $D(F_1,N)$. Then, t is updated to obtain D(t,N), using the diagonal parity group containing $D(F_1,F_1)$, until $t=N-1-F_1$. Since storage unit N in this embodiment contains only data blocks and N+1 is assume to be prime, we may recover the unavailable blocks by "traversing" the blocks in "zig-zag" fashion. If, however, $F_2$ does not equal N, then that storage unit contains both data and parity blocks. Therefore, we cannot recover the block $D(N-1-F_1,N)$ as previously indicated. To do this, and complete the reconstruction, t is reset as $t=(F_2-F_1-1)$, as indicated in the second loop of FIG. 3. This particular reconstruction technique is also illustrated by the two previous reconstruction examples described in detail above with respect to FIG. 2.

One disadvantage of the embodiment previously described, particularly if a double failure occurs, is that if the lost data is to be accessed, then that data is again reconstructed whenever there is a request for access. In an alternative embodiment, a storage array may include spare storage space. Therefore, when the data is reconstructed, the data signals may be stored in the spare space so that for later accesses of the lost data, additional reconstruction is not employed, at least with respect to the data signals that have already been reconstructed and then stored. Likewise, alternative ways to allocate the spare storage space are possible and the invention is not limited in scope to a particular approach. For example, two spare storage units for this purpose may be provided in the array. Alternatively, two blocks of spare storage space may be allocated to each storage unit so that the spare space is distributed across different storage units. Furthermore, less spare storage space, or more spare storage space may be allocated. The approach employed may vary widely depending on the particular situation.

While certain features of the invention have been illustrated and described herein, many modifications, substitutions, changes and equivalents thereof will now occur to those skilled in the art. It is, therefore, to be understood that the appended claims are intended to cover all such modifications and changes as fall within the true spirit of the invention.

What is claimed is:

1. A method of encoding data signals for storage to tolerate failure of a storage unit of a storage medium comprising:

for N+2 storage units, N being a positive integer, each of the storage units divided into N storage blocks, producing 2N blocks of parity signals from (N)(N) blocks of data signals; and allocating the N(N+2) blocks of parity and data signals over the N+2 storage units of the storage medium so that the 2N blocks of parity signals are not exclusively stored in two of the N+2 storage units.

2. The method of claim 1, wherein said 2N blocks of parity signals comprise horizontal parity signals and diagonal parity signals.

3. The method of claim 2, wherein the diagonal parity signals generated are substantially in accordance with the following equation:

$$D(i,N-1-i)=\oplus D(l,j), \text{ where } j=0 \text{ to } N, j\neq N-1-i, 0\leq i \leq N-1.$$

4. The method of claim 2, wherein the horizontal parity signals generated are substantially in accordance with the following equation:

$$D(i,N+1)=\oplus D(N-1-j,(N-i+j)\mod(N+1)), \text{ where } j=0 \text{ to } N-1, 0\leq i\leq N-1.$$

5. The method of claim 2, wherein the diagonal parity signals are exclusively stored in one of the N+2 storage units.

6. The method of claim 5, wherein the horizontal parity signals are distributively stored across only N of the N+2 storage units.

7. The method of claim 6, wherein one of the N+2 storage units exclusively stores data signals.

8. A storage medium comprising:

N+2 storage units to store binary digital signals, N being a positive integer, each of the storage units being divided into N storage blocks, said N+2 storage units having stored thereon 2N blocks of parity signals and (N)(N) blocks of data signals, the 2N blocks of parity signal being based upon the (N)(N) blocks of data signals;

said 2N blocks of parity signals being distributively stored over said N+2 storage units so that the 2N blocks of parity signals are not exclusively stored in two of the N+2 storage units.

9. The storage medium of claim 8, wherein said 2N blocks of parity signals comprise horizontal parity signals and diagonal parity signals.

10. The storage medium of claim 9, wherein the diagonal parity signals are substantially in accordance with the following equation:

$$D(i,N-1-i)=\oplus D(i,j), \text{ where } j=0 \text{ to } N, j\neq N-1-i, 0\leq i \leq N-1.$$

11. The storage medium of claim 9, wherein the horizontal parity signals are substantially in accordance with the following equation:

$$D(i,N+1)=\oplus D(N-1-j,(N-i+j)\mod(N+1)), \text{ where } j=0 \text{ to } N-1, 0\leq i\leq N-1.$$

12. The storage medium of claim 9, wherein the diagonal parity signals are exclusively stored in one of the N+2 storage units.

13. The storage medium of claim 12, wherein the horizontal parity signals are distributively stored across only N of the N+2 storage units.

14. The method of claim 13, wherein one of the N+2 storage units exclusively stores data signals.

15. A apparatus comprising:

N+2 storage units adapted to store binary digital signals, N being a positive integer, each of the storage units being adapted to be divided into N storage blocks, said N+2 storage units being adapted to have stored thereon 2N blocks of parity signals and (N)(N) blocks of data signals, the 2N blocks of parity signal being based upon the (N)(N) blocks of data signals;

said N+2 storage units being adapted so that said 2N blocks of parity signals are not to be exclusively stored in two of the N+2 storage units.

16. The apparatus of claim 15, wherein said 2N blocks of parity signals are to comprise horizontal parity signals and diagonal parity signals.

17. The apparatus of claim 16, wherein the diagonal parity signals are to be substantially in accordance with the following equation:

$$D(i,N-1-i)=\oplus D(i,j), \text{ where } j=0 \text{ to } N, j\neq N-1-i, 0\leq i \leq N-1.$$

18. The apparatus of claim 16, wherein the horizontal parity signals are to be substantially in accordance with the following equation:

$$D(i,N+1)=\oplus D(N-1-j,(N-i+j)\mod(N+1)), \text{ where } j=0 \text{ to } N-1, 0\leq i\leq N-1.$$

19. The apparatus of claim 16, wherein the diagonal parity signals are to be exclusively stored in one of the N+2 storage units.

20. The apparatus of claim 19, wherein the horizontal parity signals are to be distributively stored across only N of the N+2 storage units.

21. The apparatus of claim 20, wherein one of the N+2 storage units is to exclusively store data signals.

22. An article comprising: a storage medium, said storage medium having stored therein instructions, which when executed by a processor, result in:

N+2 storage units to store binary digital signals, N being a positive integer, each of the storage units being divided into N storage blocks, said N+2 storage units having stored thereon 2N blocks of parity signals and (N)(N) blocks of data signals, the 2N blocks of parity signal being based upon the (N)(N) blocks of data signals;

said 2N blocks of parity signals being distributively stored over said N+2 storage units so that the 2N blocks of parity signals are not exclusively stored in two of the N+2 storage units.

23. The article of claim 22, wherein said 2N blocks of parity signals comprise horizontal parity signals and diagonal parity signals.

24. The article of claim 23, wherein the diagonal parity signals are substantially in accordance with the following equation:

$$D(i, N-1i) = \oplus D(i,j), \text{ where } j=0 \text{ to } N, j \neq N-1-i, 0 \leq i \leq N-1.$$

25. The article of claim 23, wherein the horizontal parity signals are substantially in accordance with the following equation:

$$D(i, N+1) = \oplus D(N-1-j, (N-i+j) \bmod (N+1)), \text{ where } j=0 \text{ to } N-1, 0 \leq i \leq N-1.$$

26. The article of claim 22, wherein N comprises a positive prime number.

27. A method of reconstruction data signals encoded for storage to tolerate failure of a storage unit of a storage medium having N+2 storage units, N being positive integer, each of the storage units having been divided into N storage blocks, 2N blocks of parity signals having been produced from (N)(N) blocks of data signals, said method comprising:

allocating the N(N+2) blocks of parity and data signals over the N+2 storage units of the medium so that the 2N blocks of parity signals are not exclusively stored in two of the N+2 storage units; and after at least one of the storage units fail, using selected data and parity signals to reconstruct the data signals lost as a result of the failure.

28. The method of claim 27, wherein the at least one of the storage units comprises two storage units.

29. A method of updating a data signal encoded for storage to tolerate failure of a unit of a storage medium having N+2 storage units, N being a positive integer, each of the storage units having been divided into N storage blocks, 2N blocks of parity signals having been produced from (N)(N) locks of data signals, said method comprising:

allocating the N(N+2) blocks of parity and data signals over the N+2 storage units of the storage medium so that the 2N blocks of parity signals are not exclusively stored in two of the N+2 storage units; and reading the data to be updated and any associated parity signals;

processing the data signal to be updated, the any associated parity signals, and the data signal updating the data signal to be updated to produce updated parity signals; and writing the data signal updating the data signal to be updated and the updated parity so as to replace the data signal to be updated and the any associated parity signals.

30. The method of claim 29, wherein the any associated parity signals comprise a horizontal parity signal and a diagonal parity signal corresponding to the data signal to be updated; and the updated parity signals comprise an updated horizontal parity signal and an updated diagonal parity signal.

31. A apparatus comprising:

N+2 storage units adapted to store binary digital signals, N being a positive integer, each of the storage units being adapted to be divided into N storage blocks, said N+2 storage units being adapted to have stored thereon (N)(N) blocks of data and parity signals, the blocks of parity signal being based upon the blocks of data signals;

said N+2 storage units being adapted so that said blocks of parity signals are not to be exclusively stored in two of the N+2 storage units; and said N+2 storage units being adapted so that 2N of said blocks are to comprise spare storage space for any one of data signals and parity signals.

32. The apparatus of claim 31, wherein the 2N blocks of spare storage space are exclusively to be in two storage units of said N+2 storage units.

33. The apparatus of claim 32, wherein the 2N blocks of spare storage space are to be distributed across said N+2 storage units.

34. A storage medium comprising:

N+2 storage units to store binary digital signals, N being a positive integer, each of the storage units being divided into N storage blocks, said N+2 storage units having stored thereon (N)(N) blocks of data and parity signals, the blocks of parity signal being based upon the blocks of data signals;

said blocks of parity signals being distributively stored over said N+2 storage units so that said blocks of parity signals are not exclusively stored in two of the N+2 storage units; and 2N of said blocks of said N+2 storage units comprising spare storage space for any one of data signals and parity signals.

35. The storage medium of claim 34, wherein the 2N blocks of spare storage space are exclusively in two storage units of said N+2 storage units.

36. The storage medium of claim 34, wherein the 2N blocks of spare storage space are distributed across said N+2 storage units.

* * * * *

UNITED STATES PATENT AND TRADEMARK OFFICE
CERTIFICATE OF CORRECTION

PATENT NO.    : 6,247,157 B1
DATED         : June 12, 2001
INVENTOR(S)   : Edirisooriya Page 1 of 1

It is certified that error appears in the above-identified patent and that said Letters Patent is hereby corrected as shown below:

Column 7,
Line 7, delete "2N(N--1)" and insert -- 2N(N-1) --.

Column 11,
Line 26, delete "D(i,N-1i)" and insert -- D(i, N-1-i) --.
Line 58, delete "locks" and insert -- blocks --.

Signed and Sealed this

Twenty-eighth Day of May, 2002

Attest:

Attesting Officer

JAMES E. ROGAN
Director of the United States Patent and Trademark Office